United States Patent
Lee et al.

(10) Patent No.: US 8,438,446 B2
(45) Date of Patent: May 7, 2013

(54) METHOD FOR TRANSMITTING/RECEIVING BROADCAST OR MULTICAST SERVICE AND TERMINAL THEREOF

(75) Inventors: Young-Dae Lee, Gyeonggi-Do (KR); Sung-Duck Chun, Gyeonggi-Do (KR); Sung-Jun Park, Gyeonggi-Do (KR); Seung-June Yi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 686 days.

(21) Appl. No.: 12/665,243

(22) PCT Filed: Jun. 18, 2008

(86) PCT No.: PCT/KR2008/003458
§ 371 (c)(1), (2), (4) Date: Aug. 30, 2010

(87) PCT Pub. No.: WO2008/156302
PCT Pub. Date: Dec. 24, 2008

(65) Prior Publication Data
US 2010/0325504 A1    Dec. 23, 2010

Related U.S. Application Data

(60) Provisional application No. 60/944,785, filed on Jun. 18, 2007, provisional application No. 60/945,090, filed on Jun. 19, 2007.

(30) Foreign Application Priority Data

Jun. 3, 2008  (KR) ................. 10-2008-0052332

(51) Int. Cl.
*G06F 11/00* (2006.01)

(52) U.S. Cl.
USPC ............................ 714/749; 714/750

(58) Field of Classification Search ............. 714/748, 714/749, 750
See application file for complete search history.

(56) References Cited

U.S. PATENT DOCUMENTS

| 5,588,009 A | 12/1996 | Will |
| 6,233,430 B1 | 5/2001 | Helferich |
| 6,324,171 B1 | 11/2001 | Lee et al. |

(Continued)

FOREIGN PATENT DOCUMENTS

| EP | 0 889 664 A2 | 1/1999 |
| EP | 1 148 735 A1 | 10/2001 |

(Continued)

OTHER PUBLICATIONS

"3rd Generation Partnership Project; Technical Specification Group Radio Access Network; Packet Data Convergence Protocol (PDCP) specification (Release 7)," XP-050367856; pp. 1-44; Mar. 2007.

(Continued)

*Primary Examiner* — Dieu-Minh Le
(74) *Attorney, Agent, or Firm* — Birch, Stewart, Kolasch & Birch, LLP

(57) ABSTRACT

A method for receiving a multimedia broadcast/multicast service (MBMS) is provided. The method for receiving a broadcast or multicast service includes: attempting receiving of data via a channel for the broadcast or multicast service; transmitting a negative acknowledgement to a base station if the data is not received via the channel; and receiving the data.

10 Claims, 5 Drawing Sheets

U.S. PATENT DOCUMENTS

| | | |
|---|---|---|
| 6,353,628 B1 | 3/2002 | Wallace et al. |
| 6,526,027 B1 | 2/2003 | Yeom |
| 6,725,267 B1 | 4/2004 | Hoang |
| 6,785,256 B2 | 8/2004 | O'Neill |
| 6,795,419 B2 | 9/2004 | Parantainen et al. |
| 6,859,445 B1 | 2/2005 | Moon et al. |
| 7,020,822 B2 | 3/2006 | Ho et al. |
| 7,039,425 B1 | 5/2006 | Mazawa et al. |
| 7,525,908 B2 | 4/2009 | Olsson et al. |
| 7,551,643 B2 | 6/2009 | Yeo et al. |
| 7,606,370 B2 | 10/2009 | Lillie et al. |
| 7,916,697 B2 | 3/2011 | Eklund |
| 8,064,676 B2 | 11/2011 | Li et al. |
| 2001/0017850 A1 | 8/2001 | Kalliokulju et al. |
| 2001/0044322 A1 | 11/2001 | Raaf |
| 2002/0028690 A1 | 3/2002 | McKenna et al. |
| 2002/0057663 A1 | 5/2002 | Lim |
| 2002/0114294 A1 | 8/2002 | Toskala et al. |
| 2003/0007512 A1 | 1/2003 | Tourunen et al. |
| 2003/0123485 A1 | 7/2003 | Yi et al. |
| 2003/0139170 A1 | 7/2003 | Heo |
| 2003/0147371 A1 | 8/2003 | Choi et al. |
| 2003/0165133 A1 | 9/2003 | Garani |
| 2003/0189922 A1 | 10/2003 | Howe |
| 2003/0207696 A1 | 11/2003 | Willenegger et al. |
| 2003/0223452 A1 | 12/2003 | Toskala et al. |
| 2004/0014452 A1 | 1/2004 | Lim et al. |
| 2004/0028078 A1 | 2/2004 | Beckmann et al. |
| 2004/0117860 A1 | 6/2004 | Yi et al. |
| 2004/0121771 A1 | 6/2004 | Song et al. |
| 2004/0147269 A1 | 7/2004 | Kim |
| 2004/0202107 A1 | 10/2004 | Bensimon et al. |
| 2004/0233870 A1 | 11/2004 | Willenegger et al. |
| 2004/0242195 A1 | 12/2004 | Chun et al. |
| 2004/0253959 A1 | 12/2004 | Hwang et al. |
| 2005/0041610 A1 | 2/2005 | Lee et al. |
| 2005/0041681 A1 | 2/2005 | Lee et al. |
| 2005/0053029 A1 | 3/2005 | Lee et al. |
| 2005/0085254 A1 | 4/2005 | Chuah et al. |
| 2005/0094670 A1 | 5/2005 | Kim |
| 2005/0096017 A1 | 5/2005 | Kim |
| 2005/0100048 A1 | 5/2005 | Chun et al. |
| 2005/0141462 A1 | 6/2005 | Aerrabotu et al. |
| 2005/0176430 A1 | 8/2005 | Lee et al. |
| 2005/0176474 A1 | 8/2005 | Lee et al. |
| 2005/0185620 A1* | 8/2005 | Lee et al. ............ 370/331 |
| 2005/0233732 A1 | 10/2005 | Kwak et al. |
| 2005/0238051 A1 | 10/2005 | Yi et al. |
| 2005/0288022 A1 | 12/2005 | Ryu et al. |
| 2006/0067361 A1 | 3/2006 | Lee et al. |
| 2006/0067364 A1 | 3/2006 | Jung et al. |
| 2006/0087994 A1 | 4/2006 | Barth et al. |
| 2006/0126554 A1 | 6/2006 | Motegi et al. |
| 2006/0165045 A1 | 7/2006 | Kim et al. |
| 2006/0195540 A1 | 8/2006 | Hamilton et al. |
| 2006/0209870 A1 | 9/2006 | Lee et al. |
| 2006/0245417 A1 | 11/2006 | Conner et al. |
| 2006/0251105 A1 | 11/2006 | Kim et al. |
| 2007/0024972 A1 | 2/2007 | Kuerz et al. |
| 2007/0047452 A1 | 3/2007 | Lohr et al. |
| 2007/0060139 A1 | 3/2007 | Kim et al. |
| 2007/0064665 A1 | 3/2007 | Zhang et al. |
| 2007/0165567 A1 | 7/2007 | Tan et al. |
| 2007/0177569 A1 | 8/2007 | Lundby |
| 2007/0206531 A1 | 9/2007 | Pajukoski et al. |
| 2007/0224993 A1 | 9/2007 | Forsberg |
| 2007/0248075 A1 | 10/2007 | Liu et al. |
| 2007/0291646 A1 | 12/2007 | Ohishi et al. |
| 2007/0291673 A1 | 12/2007 | Demirhan et al. |
| 2007/0291728 A1 | 12/2007 | Dalsgaard et al. |
| 2007/0291729 A1 | 12/2007 | Dalsgaard et al. |
| 2007/0293224 A1 | 12/2007 | Wang et al. |
| 2008/0025263 A1 | 1/2008 | Pelkonen |
| 2008/0056198 A1 | 3/2008 | Charpentier et al. |
| 2008/0056273 A1 | 3/2008 | Pelleter et al. |
| 2008/0089285 A1* | 4/2008 | Pirskanen et al. ............ 370/329 |
| 2008/0101268 A1 | 5/2008 | Sammour et al. |
| 2008/0167089 A1 | 7/2008 | Suzuki et al. |
| 2008/0181127 A1 | 7/2008 | Terry et al. |
| 2008/0259912 A1 | 10/2008 | Wang et al. |
| 2009/0005051 A1 | 1/2009 | Voyer et al. |
| 2009/0016275 A1 | 1/2009 | Liu et al. |
| 2009/0034466 A1 | 2/2009 | Lindskog et al. |
| 2010/0075635 A1 | 3/2010 | Lim et al. |
| 2010/0137016 A1 | 6/2010 | Voyer |
| 2010/0165901 A1 | 7/2010 | Kim |
| 2010/0195568 A1 | 8/2010 | Iimori |
| 2011/0182243 A1 | 7/2011 | Gallagher et al. |
| 2011/0207427 A1 | 8/2011 | Kitani et al. |
| 2011/0261743 A1 | 10/2011 | Futaki et al. |

FOREIGN PATENT DOCUMENTS

| | | |
|---|---|---|
| EP | 1 168 877 A1 | 1/2002 |
| EP | 1 209 938 A1 | 5/2002 |
| EP | 1 304 898 A1 | 4/2003 |
| EP | 1 315 356 A2 | 5/2003 |
| EP | 1 318 632 A2 | 6/2003 |
| EP | 1 337 124 A2 | 8/2003 |
| EP | 1 372 310 A1 | 12/2003 |
| EP | 1511245 A2 | 3/2005 |
| EP | 1 501 328 A3 | 4/2006 |
| EP | 1 420 551 A3 | 11/2006 |
| EP | 1 720 373 A1 | 11/2006 |
| EP | 1720322 A1 | 11/2006 |
| EP | 2 087 653 A1 | 8/2009 |
| JP | 06-006294 A | 1/1994 |
| JP | 2002-539686 T | 11/2002 |
| JP | 2003-504935 | 2/2003 |
| JP | 2003-235064 A | 8/2003 |
| JP | 2005-354488 | 12/2005 |
| JP | 2006-505979 | 2/2006 |
| JP | 2006-067115 A | 3/2006 |
| JP | 2006-515737 T | 6/2006 |
| JP | 2009-540721 A | 11/2009 |
| JP | 2009-542100 A | 11/2009 |
| KR | 10-2001-0105240 | 11/2001 |
| KR | 10-2003-0026924 A | 4/2003 |
| KR | 10-0383603 B1 | 5/2003 |
| KR | 10-2004-0039944 A | 5/2004 |
| KR | 2004-0048675 A | 6/2004 |
| KR | 10-2004-0072961 A | 8/2004 |
| KR | 10-2005-0008440 A | 1/2005 |
| KR | 2005-0027972 A | 3/2005 |
| KR | 10-2005-0081836 A | 8/2005 |
| KR | 10-2005-0096763 A | 10/2005 |
| KR | 10-2006-0014910 A | 2/2006 |
| RU | 2 249 917 C2 | 3/2003 |
| WO | WO-00/54521 A2 | 9/2000 |
| WO | WO-00/74416 A1 | 12/2000 |
| WO | WO-01/05050 A1 | 1/2001 |
| WO | 02/39622 A1 | 5/2002 |
| WO | WO 2004/043094 A2 | 5/2004 |
| WO | WO-2004/043099 A2 | 5/2004 |
| WO | WO-2004/064272 A1 | 7/2004 |
| WO | WO 2005/048613 A1 | 5/2005 |
| WO | WO 2006/018670 A1 | 2/2006 |
| WO | 2006/075820 A1 | 7/2006 |
| WO | WO-2006/104344 A2 | 10/2006 |
| WO | WO-2006/109851 A1 | 10/2006 |
| WO | WO-2007/052888 A2 | 5/2007 |
| WO | WO-2007/078155 A2 | 7/2007 |
| WO | WO-2007/078172 A2 | 7/2007 |
| WO | WO 2007/078929 A2 | 7/2007 |
| WO | WO 2007/133034 A2 | 11/2007 |
| WO | WO 2008/042889 A1 | 4/2008 |
| WO | WO 2009/084998 A1 | 7/2009 |

OTHER PUBLICATIONS

"Granulatity consideration for variable RLC FDU sizes," 3GPP TSG-RAN WG2 Meeting # 56bis; R2-070336, XP050133423; pp. 1-3, Jan. 15-19, 2007.

"3rd Generation Partnership Project; Technical Specification Group Radio Access Network; Medium Access Control (MAC) protocol specification (Release 7),"; XP050367709; pp. 1-126; Mar. 2007.

"Header Compression Signaling," TSG-RAN Working Group 2 (Radio layer 2 and Radio layer 3); TSGR2#9(99)i32; Bosch; XP050114120; pp. 1-2, Nov. 29, 1999.

Gao, Youjun, et al., "Research on the Access Network and MAC Technique for Beyond 3G Systems," IEEE Wireless Communication; XP011184637; pp. 57-61; Apr. 2007.

LG Electronics, "Discussion on Message 4 in Random Access," R2-070519, 3GPP TSG-RAN WG2 #57, Agenda Item 11.4, Feb. 15-19, 2007, St. Louis, MO, USA, 4 pages.

LG Electronics, "Discussion on Message 4 in Random Access," R2-071456, 3GPP TSG-RAN WG2 #57bis, Agenda Item 5.4, Mar. 26-30, 2007, St. Julian's, Malta, 4 pages.

LG Electronics, "Discussion on Message 4 in Random Access," R2-071923, 3GPP TSG-RAN WG2 #58, Agenda Item 4.6, May 7-11, 2007, Kobe, Japan, 4 pages.

Catt et al: "Enhancement to Buffer Status Reporting" 3GPP TSG-RAN WG2#57bis, Mar. 22, 2007, St Julian's, Malta.

NTT DoCoMo et al: "MAC PDU structure for LTE" 3GPP TSG RAN WG2 #56bis, Jan. 15-19, 2007, Sorrento, Italy.

"3rd Generation Partnership Project; Technical Specification Group Radio Access Network; Evolved Universal Terrestrial Radio Access (E-UTRA) Medium Access Control (MAC) protocol specification (Release 8)," 3GPP TS 36.321 V8.1.0, XP-050377617, Mar. 2008.

"DL Control Signaling and Multiplexing for VoIP," 3GPP TSG RAN WG1 Meeting #48bis, R1-071721, XP-002460800, Mar. 2007.

"MAC Header Format," 3GPP TSG-RAN WG2 Meeting # 59bis, R2-073891, XP-002602993, Oct. 2007.

"Support for VoIP over MAC-hs/ehs," 3GPP TSG-RAN WG2 # 57bis, R2-071542, XP-050134474, Mar. 2007.

"UL Timing Control related to Contention Resolution," 3GPP TSG-RAN WG2#61bis, R2-081607, XP-050139334, Mar. 2008.

IP Wireless, "Contention Resolution in Non-synchronous RACH Access," RAN2#54, Tallinn, Estonia, Aug. 28-Sep. 1, 2006, (5 pages).

R2-070096; 3GPP TSG RAN WG2#56bis; Source: Panasonic; "MAC PDU format for LTE"; Document for: Discussion, Decision; Agenda Item: 5.9; Jan. 15-19, 2007; Sorrento, Italy; pp. 1-3.

R2-070107; 3GPP TSG-RAN WG2 Meeting #56-bis; Source: Nokia; Agenda Item 5.5.2, 5.6.2; "Requirements for redirection in E-UTRAN"; Document for Discussion and Decision; Jan. 15-19, 2007; Sorrento, Italy.

Tdoc R2-070130; 3GPP TSG-RAN2 Meeting #56bis; Source: Samsung; Agenda Item: 5.2.6; "Selective forwarding/retransmission during HO"; Document for: Discussion and Decision; Jan. 15-19, 2007; Sorrento, Italy.

R2-050852; 3GPP TSG-RAN WG2 meeting #46bis; Source: LG Electronics Inc.; Agenda item: 11.2 (Open item 5.7); "Relative Buffer Status Reporting"; Document for: Discussion and Decision; Apr. 4-8, 2005; Beijing, China; pp. 1-3.

Tdoc R2-052377; 3GPP TSG RAN WG2 #48bis; Source: IPWireless; Agenda item: 6.3.2.2.; "Layer 2 functions for LTE"; Document for: Discussion and Decision; Oct. 10-14, 2005; Cannes, France; pp. 1-7.

Tdoc R2-061829; 3GPP TSG-RAN2 Meeting #53bis; Source: Samsung; Agenda item: 9.4; "Re-use pf PDCP SN at ARQ level?"; Document for: Discussion and Decision; Jun. 27-30, 2006; Cannes, France.

LG Electronics Inc., R2-073041; 3GPP TSG-RAN WG2 #59; Agenda Item 5.2.3, "PDCP retransmissions", Aug. 19-24, 2007, Athens, Greece, XP050135778.

LG Electronics Inc., R2-073259; 3GPP TSG-RAN WG2 #59; Agenda Item 5.2.3, "PDCP Structure and Traffic Path", Aug. 20-24, 2007, Athens, Greece, XP05013585.

LG Electronics Inc., R2-07xxxx, 3GPP TSG-RAN WG2 #59; "Contents of PDCP Status Report", Oct. 8-12, 2007, Shanghai, China, XP002580785.

Sammour et al., U.S. Appl. No. 60/863,185, filed Oct. 27, 2006.

Samsung, "LTE Handover Procedures, Text Proposal", 3GPP TSG-RAN3 Meeting #53, Tdoc R2-061338, May 12-18, 2006, 13 pages provided.

Samsung, "UL Timing Sync Procedure", 3GPP TSG-RAN2 #52, R2-0601006, Mar. 27-31, 2006, 4 pages provided, XP002434793.

Qualcomm Europe, "Open issues in random access procedure", Discussion, 3GPP TSG-RAN WG2 #55, Oct. 9-13, 2006, Seoul, Korea, pp. 1-3, R2-063034.

* cited by examiner

METHOD FOR TRANSMITTING/RECEIVING BROADCAST OR MULTICAST SERVICE AND TERMINAL THEREOF

This application is the National Phase of PCT/KR2008/003458 filed on Jun. 18, 2008, which claims priority under 35 U.S.C. 119(e) to U.S. Provisional Application No. 60/944,785 filed on Jun. 18, 2007, and U.S. Provisional Application No. 60/945,090 filed on Jun. 19, 2007, and under 35 U.S.C. 119(a) to Patent Application No. 10-2008-0052332 filed in Republic of Korea on Jun. 3, 2008, all of which are hereby expressly incorporated by reference into the present application.

TECHNICAL FIELD

The present invention relates to transmission/reception of a broadcast or multicast service and, more particularly, to transmission/reception of control information of a broadcast or multicast service.

BACKGROUND ART

FIG. 1 illustrates an exemplary structure of a general E-UTRAN (Evolved Universal Terrestrial Radio Access Network) system according to the related art and the present invention.

The E-UTRAN system as shown in FIG. 1 has been evolved from the conventional UTRAN system and a third generation partnership project (3GPP) currently proceeds with basic standardization operations. The E-UTRAN system is also called an LTE (Long Term Evolution) system.

The E-UTRAN system includes base stations (eNode Bs or eNBs) 21 to 23, and the eNBs 21 to 23 are connected via an X2 interface. The eNBs 21 to 23 are connected with a terminal (or user equipment (UE)) 10 via a radio interface and connected to an EPC (Evolved Packet Core) 30 via an S1 interface.

Layers of a radio interface protocol between the terminal 100 and a network may be divided into a first layer L1, a second layer L2, and a third layer L3 based on the three lower layers of an open system interconnection (OSI) standard model which is widely known in communication systems. A physical layer belonging to the first layer among the three lower layers provides an information transfer service using a physical channel, and a radio resource control (RRC) layer positioned at the third layer serves to control radio resources between the UE and the network. For this, the RRC layer exchanges an RRC message between the UE and the network.

FIG. 2 illustrates the structure of a radio interface protocol between the UE and a UTRAN (UMTS Terrestrial Radio Access Network) according to the 3GPP radio access network (RAN) standards. FIG. 3 is an exemplary view of a physical channel.

The radio interface protocol as shown in FIG. 2 has vertical layers comprising a physical layer, a data link layer, and a network layer. The radio interface protocol has horizontal planes comprising a user plane (U-plane) for transmitting data information and a control plane (C-plane) for transferring control signaling.

The protocol layers in FIG. 2 may be divided into a first layer L1, a second layer L2, and a third layer L3 based on the three lower layers of the open system interconnection (OSI) standard model which is widely known in communication systems.

The physical layer, namely, the first layer L1, provides information transfer service to an upper layer by using a physical channel. The physical layer is connected to an upper layer called a medium access control (MAC) layer via a transport channel. The physical layer transfers data to the MAC layer via the transport channel.

Data is transferred via the physical channel between different physical layers, namely, between a physical layer of a transmitting side and that of a receiving side. The physical channel is demodulated according to an OFDM (Orthogonal Frequency Division Multiplexing) method, and utilizes time and frequency as radio resources.

The second layer L2 is divided into two lower layers. Namely, the second layer is divided into a MAC layer and an RLC layer. The MAC layer provides a service to the RLC layer, the upper layer of the MAC layer, via a logical channel. The RLC layer supports data transmission with reliability. Here, the function of the RLC layer may be implemented as a function block within the MAC layer. In such a case, the RLC layer may not exist.

Although not shown, the second layer further comprises a PDCP layer. The PDCP layer performs a function called header compression that reduces the size of a header of an IP packet, which is relatively large and includes unnecessary control information, in order to effectively transmit the IP packet such as an IPv4 or IPv6 through a radio interface with a narrow bandwidth.

The RRC layer corresponding to the third layer is defined only in the control plane, and controls a logical channel, a transport channel and a physical channel in relation to configuration, reconfiguration, and the release of radio bearers (RBs). In this case, the RBs refer to a service provided by the second layer for data transmission between the UE 10 and the UTRAN. When an RRC connection is established between the RRC layer of the UE 10 and that of the radio network, the UE 100 is defined to be in an RRC connected mode, or otherwise, the UE 100 is defined to be in an idle mode.

A NAS (Non-Access Stratum) layer exists at an upper position of the RRC layer. The NAS layer performs a function of session management, mobility management, etc.

The physical channel, the transport channel, and the logical channel will now be described in more detail.

First, each cell formed by each of the eNBs 21 to 23 is set with one of bandwidths 1.25 Mhz, 2.5 Mhz, 5 Mhz, 10 Mhz, 20 Mhz, etc., and provides downlink or uplink physical channels to several terminals. In this case, each different cell may be set to provide each different bandwidth.

As noted with reference to FIG. 3, the physical channel comprises several sub-frames of a time axis and several sub-carriers of a frequency axis. Here, a single sub-frame comprises a plurality of symbols at the time axis. A single sub-frame comprises a plurality of resource blocks, and a single resource block comprises a plurality of symbols and a plurality of sub-carriers. Each sub-frame may use particular sub-carriers of particular symbols (e.g., a first symbol) of a corresponding sub-frame for a PDCCH (Physical Downlink Control Channel), namely, an L1/L2 control channel. A single sub-frame is 0.5 ms, and a TTI (Transmission Time Interval), a time unit for data transmission, is 1 ms corresponding to two sub-frames.

Next, the transport channel includes a downlink transport channel for transmitting data from a network to a terminal and an uplink transport channel for transmitting data from the terminal to the network. The downlink transport channel for transmitting data from the network to the terminal includes a broadcast channel (BCH) for transmitting system information, a paging channel (PCH) for transmitting a paging message, and a downlink shared channel (DL-SCH) for transmitting user traffic or a control message. The downlink traffic of a broadcast or multicast service, or the control message of the broadcast or multicast service may be transmitted via the downlink SCH or a separate downlink MCH (Multicast Channel).

The uplink transport channel for transmitting data from the terminal to the network includes a random access channel (RACH) for transmitting an initial control message and an uplink SCH for transmitting other user traffic or a control message.

The logical channel includes a BCCH (Broadcast Control Channel) for broadcasting system control information, a PCCH (Paging Control Channel) for transmitting paging information, a CCCH (Common Control Channel) for transmitting control information between a terminal and a network, or the like. The BCCH is mapped to the BCH of the transport channel, and the PCCH is mapped to the PCH of the transport channel.

The logical channel further includes an MCCH (Multicast Control Channel) for an MBMS (Multimedia Broadcast Multicast Service), an MTCH (Multicast Traffic Channel) for the MBMS service, or the like. The MCCH is used to transmit control information for MBMS transmission to a terminal, and the MTCH is used to transmit the MBMS service to the terminal.

The MBMS refers to providing a streaming or background service to a plurality of terminals by using a downlink-dedicated MBMS bearer service. The MBMS bearer uses a point-to-multipoint radio bearer service and a point-to-point radio bearer service in the UTRAN.

In the above-described related art, the base station periodically transmits control information of the MBMS via the MCCH. However, because the period is so long that the terminal should wait for a considerably long time to receive the control information of the MBMS.

DISCLOSURE OF INVENTION

Technical Solution

Therefore, an object of the present invention is to provide a method for allowing a terminal to receive control information of an MBMS (Multimedia Broadcast Multicast Service) within a short time.

To achieve these and other advantages and in accordance with the purpose of the present invention, as embodied and broadly described herein, there is provided a method for receiving a broadcast or multicast service, including: attempting receiving of data via a channel for the a broadcast or multicast service; transmitting a negative acknowledgement to a base station if the data is not received via the channel; and receiving the data.

The channel for the broadcast or multicast service may be an MCCH (Multicast Control Channel) for MBMS (Multimedia Broadcast Multicast Service) control information, or an MTCH (Multicast Traffic Channel) for user data of the MBMS. The channel for the broadcast or multicast service may be mapped to a DL SCH (Downlink Shared Channel) or PDCCH (Physical Downlink Control Channel).

The data including the MBMS control information may be transmitted using an RRC (Radio Resource Control) message.

The negative acknowledgement may be transmitted by an HARQ (Hybrid Automatic Repeat Request) entity in a MAC layer via a PUCCH (Physical Uplink Control Channel).

The method may further comprise receiving HARQ (Hybrid Automatic Repeat Request) configuration information from the base station.

To achieve the above object, there is also provided a method for transmitting a broadcast or multicast service, including: transmitting data to a terminal via a channel for the broadcast or multicast service; receiving a negative acknowledgement from the terminal; and retransmitting the data to the terminal.

To achieve the above object, there is also provided a terminal having a MAC layer including: an HARQ (Hybrid Automatic Repeat Request) entity that attempts receiving of a PDU (Protocol Data Unit) of a broadcast or multicast service from a base station via a DL-SCH (Downlink Shared Channel), and transmits a negative acknowledgement to the base station if receiving of the PDU fails; a disassemble entity that generates an SDU (Service Data Unit) by using the PDU; and a de-multiplexing entity that delivers the SDU to an upper layer via an MCCH.

To achieve the above object, there is also provided a terminal including: a transmission/reception unit that attempts receiving of data via a channel for a broadcast or multicast service and transmits a negative acknowledgement to a base station if the data is not received; and a controller that controls transmitting the negative acknowledgement in case where the reception of the data fails.

As described above, the present invention provides the control information receiving method in which the terminal attempts receiving of a point-to-multipoint control channel transmitting a broadcast or multicast control information, and if the terminal fails to receive the point-to-multipoint control channel, it transmits a negative acknowledgement informing about the reception failure via uplink, in order to receive again the multicast control information. Thus, the terminal can receive a broadcast or control information of multicast transmission within a short time.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Figure 1:
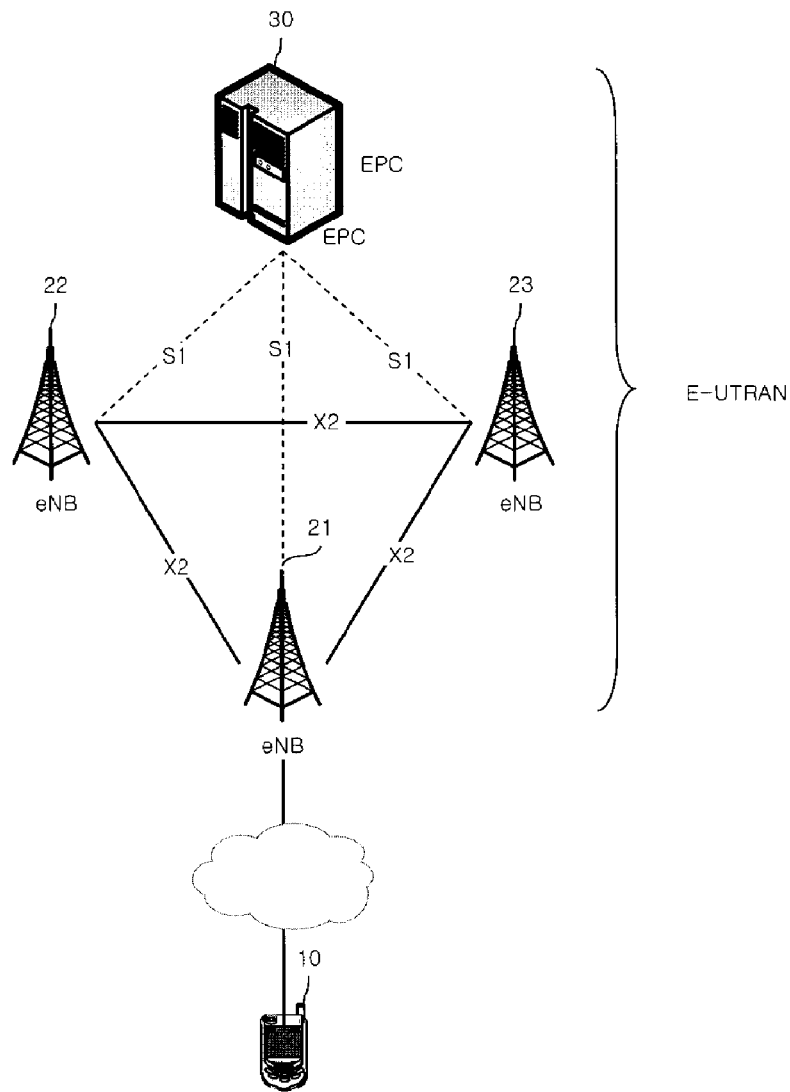
FIG. 1 illustrates an exemplary structure of a general E-UTRAN (Evolved Universal Terrestrial Radio Access Network) system according to the related art and the present invention.

The present invention is applied to a UTRAN (Universal Terrestrial Radio Access Network) based on a 3GPP radio access network. However, the present invention is not limited thereto but may be applicable to any communication system and method to which the technical idea of the present invention is applicable.

The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "connected with" another element, it can be directly connected with the other element or intervening elements may also be present. In contrast, when an element is referred to as being "directly connected with" another element, there are no intervening elements present.

The exemplary embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

A UE (User Equipment) is exemplarily shows in the drawings but it can be mentioned in the term such as a terminal, an ME (Mobile Equipment), and the like. In addition, the UE may be a portable device such as a notebook computer, a mobile phone, a PDA, a smart phone, a multimedia player, or the like, or may be device that cannot be portable such as a PC or a vehicle-mounted device.

Figure 4:
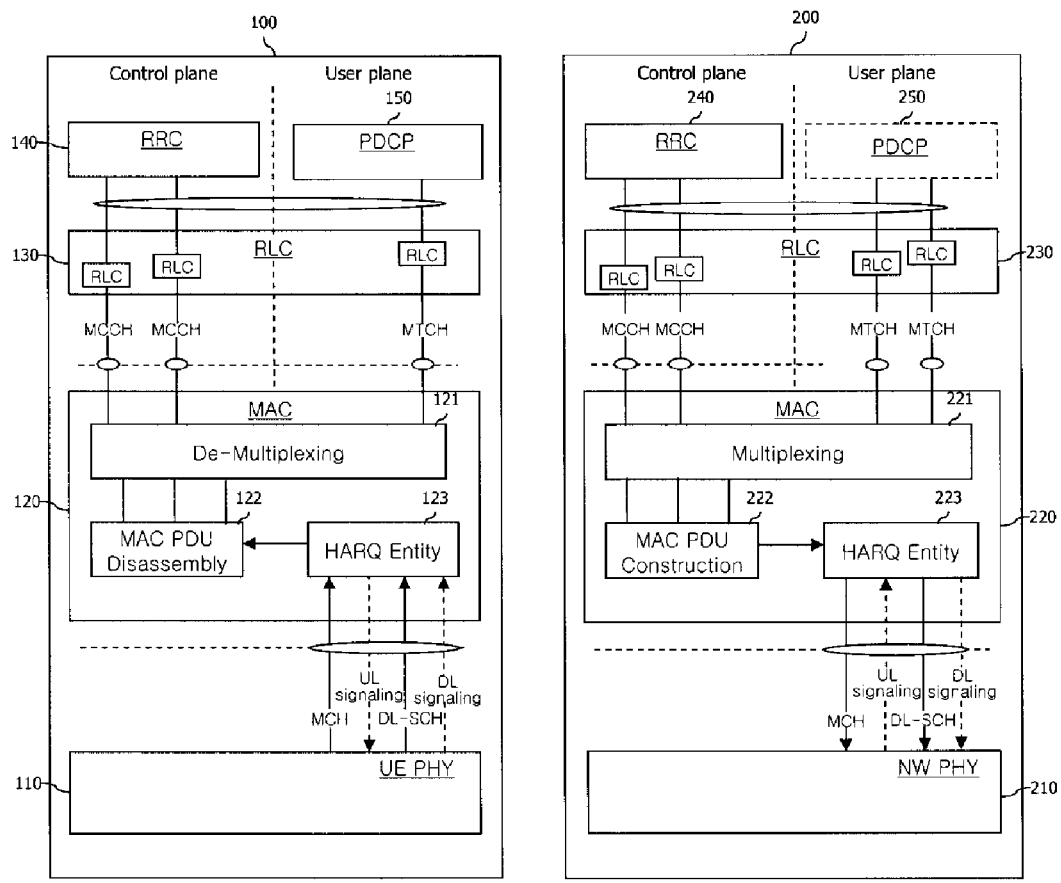
FIG. 4 is an exemplary view showing protocols of a UE (User Equipment) and a base station according to the present invention.

FIG. 4 is an exemplary view showing protocols of a UE (User Equipment) and a base station according to the present invention.

Figure 2:
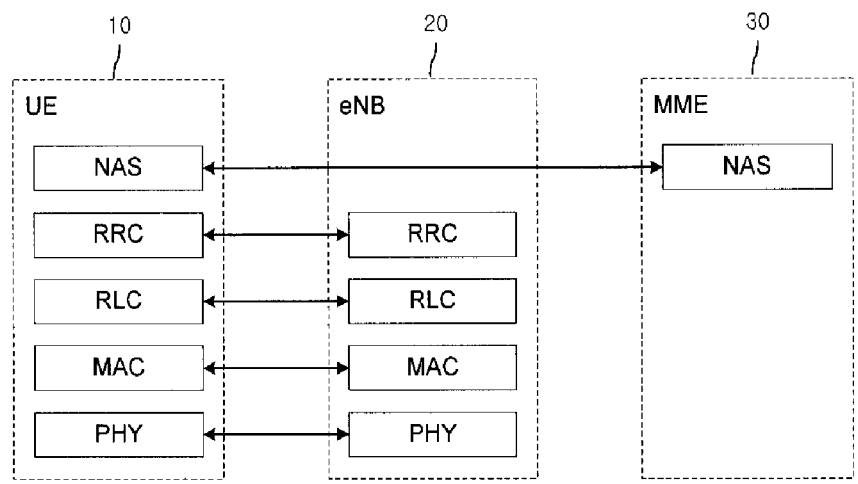
FIG. 2 illustrates the structure of a radio interface protocol between the UE and a UTRAN (UMTS Terrestrial Radio Access Network) according to the 3GPP radio access network (RAN) standards.
Figure 3:
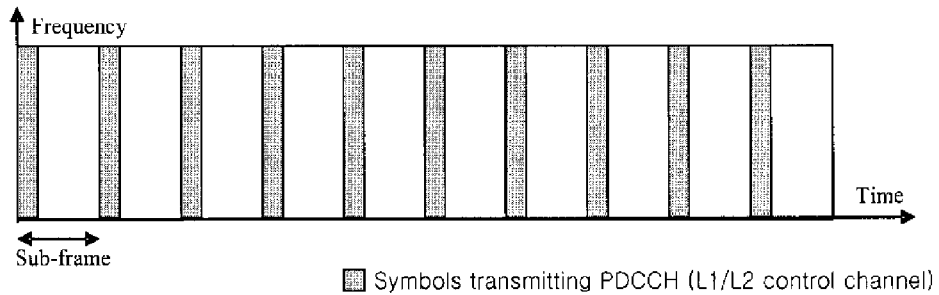
FIG. 3 is an exemplary view of a physical channel.

As shown in FIG. 4, the protocols of a UE 100 and a base station (or eNB) 200 include, respectively, vertical layers comprising physical layers 110 and 210, MAC (Medium Access Control) layers 120 and 220, RLC (Radio Link Control) layers 130 and 230, RRC (Radio Resource Control) layers 140 and 240, and horizontal planes comprising a control plane (C-plane) for transferring control signaling and a user plane (U-plane) for transmitting data information. The RRC layers 140 and 240 are included only in the control planes. The UE 100 and the base station 200 further include PDCP (Packet Data Convergence Protocol) layers 150 and 250 defined only in the user planes. The MAC layer 220 of the base station (eNB) 200 includes a multiplexing unit 221 for multiplexing logical channels, a MAC PDU construction unit 222 for generating a PDU (Protocol Data Unit), and an HARQ entity 223. The MAC layer 120 of the UE 100 includes a demultiplexing unit 121 that delivers the SDU to an upper layer via a logical channel, a MAC PDU disassembly unit 122 that generates the SDU by using the received PDU and delivers the SDU to the demultiplexing unit 121, and an HARQ entity 123. Other layers have been described with reference to FIG. 2, so the description with respect to FIG. 2 will be applied for those layers to avoid repeated description.

The RRC layer 240 of the eNB (or base station) 200 as shown in FIG. 4 periodically transmits MBMS control information. For this purpose, the RRC layer 240 of the eNB 200 delivers the MBMS control information to the RLC layer 230. Then, the RLC layer 230 of the eNB (base station) 200 delivers a data unit including the MBMS control information to the MAC layer 220 via an MCCH (Multicast Control Channel) which is a logical channel. The MCCH, namely, the logical channel, is mapped to a DL-SCH (Downlink Shared Channel) which is a transport channel. The DL-SCH is mapped to a PDCCH (Physical Downlink Control Channel) which is a physical channel.

When the RRC layer 240 of the eNB (base station) 200 transmits the MBMS control information, the MAC layer 220 of the eNB (base station) 200 transmits an MCCH-RNTI via the PDCCH which is a physical channel, related to the MCCH. The MCCH-RNTI indicates in which sub-frame the control information of the MCCH is included.

With the MCCH mapped to the DL-SCH, if a negative acknowledgement, e.g., NACK, is received from the UE 100, the MAC layer 220 of the eNB (base station) 200 can retransmit the control information via the MCCH.

Meanwhile, when MBMS data is received from an MBMS gateway (GW), the RLC layer 230 of the eNB 200 transmits the data unit including the MBMS data to the UE 100. In this case, the eNB 200 may further include the PDCP layer 250. The data unit may be generated from the PDCP layer of the eNB 200.

The RLC layer 230 of the eNB 200 delivers the data unit of the MBMS to the MAC layer 220 via an MTCH (Multicast Traffic Channel). The MAC layer 220 of the eNB 200 may map the MTCH to a MCH (Multicast Channel). In addition, the MAC layer 220 of the eNB 200 may map the MTCH to the DL-SCH.

When the MTCH is mapped to the DCH and MBMS data is transmitted via the MTCH, the HARQ entity 223 of the MAC layer 220 of the eNB 200 may retransmit the MBMS data via the MTCH according to a predefined configuration. If the MTCH is mapped to the DL-SCH and when a negative acknowledgement, e.g., NACK, is received from the UE 100, the MAC layer 220 of the eNB 200 may retransmit the MBMS data via the MTCH.

For example, the eNB 200 transmits the data unit of the MBMS to the UE 100 via the MCH and retransmits it according to a predefined configuration. If, however, a negative acknowledgement, e.g., NACK, is received from the UE 100, the HARQ entity positioned at the MAC layer 220 of the eNB 200 stores the data unit of the MBMS transmitted via the MCH and retransmits it via the DL SCH.

As described above, when the MTCH or the MCCH is mapped to the DL SCH, the MAC 220 of the eNB 200 may retransmit the MTCH or the MCCH according to a predefined configuration.

The UE 100 as shown in FIG. 4 monitors the PDCCH which is a physical channel. In this case, if the DL SCH which is a transport channel, is mapped to the PDCCH and the MCCH or the MTCH is mapped to the DL SCH, the UE 100 may set a UE-dedicated uplink feedback channel such as a PUCCH (Physical Uplink Control Channel).

If the UE 100 fails to accurately receive the MBMS control information or MBMS data unit, the HARQ entity existing at the MAC layer 120 of the UE 100 transmits a negative acknowledgement, e.g., NACK, to the eNB 200 via the PUCCH. If the UE 100 receives re-transmitted MBMS control information or MBMS data unit, the UE 100 may combine the previously transmitted MBMS control information or MBMS data unit, and the re-transmitted MBMS control information or MBMS data unit. And then, the UE 100 perform decoding.

If the MTCH or the MCCH is mapped to the MCH, the UE 100 does not need to configure the UE-dedicated uplink feedback channel such as the PUCCH. And, although the UE 100 fails to accurately receive the MBMS data unit, the HARQ entity of the UE 100 does not transmit NACK. Instead, even without receiving a negative acknowledgement, the eNB 200 retransmits the data unit according to a predefined configuration and the UE 100 may combine a previously transmitted data unit, which is incomplete, and the re-transmitted data unit (i.e., the data unit re-transmitted by the eNB 200) and perform decoding. For this, the RRC layer 240 of the eNB 200 may provide HARQ information to the UE 100. The HARQ information includes the number of re-transmissions of HARQ, IR pattern information of the HARQ, and predetermined time/frequency information of HARQ transmission/retransmission. For example, if an MBMS data unit, which has been transmitted via the MCH, is retransmitted via the DL-SCH, the UE 100 may combine the data unit received via the MCH and the data unit re-received via the DL-SCH and combine them to decode. If they are not accurately decoded, the HARQ entity of the UE 100 may transmit NACK via the PUCCH.

Figure 5:
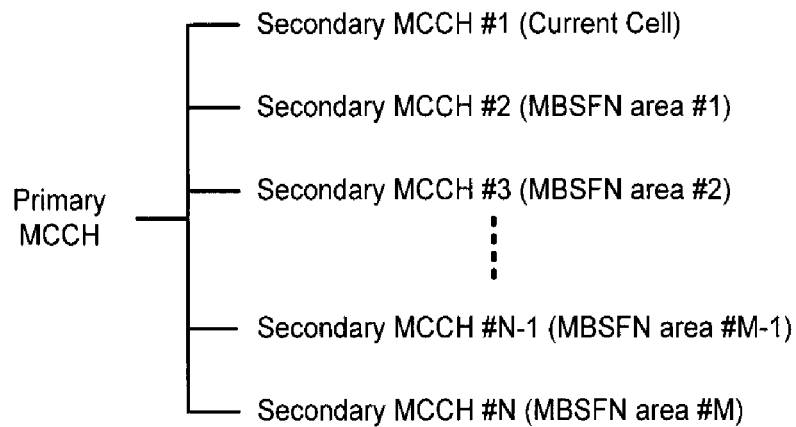
FIG. 5 is an exemplary view of an MCCH (Multicast Control Channel)

FIG. 5 is an exemplary view of the MCCH (Multicast Control Channel).

As shown in FIG. 5, in the present invention, the MCCH which is a logical channel, may be divided into a P-MCCH (Primary MCCH) and an S-MCCH (Secondary MCCH).

The P-MCCH is mapped to the DL-SCH which is a transport channel, and is used for notification of an MBMS provided in a cell. The P-MCCH is used to transmit modified service information (MSI) and unmodified service information (USI) and channel configuration information of the S-MCCH. The service information may inform a particular UE of a change in MBMS control information with respect to a particular MBMS. In addition, the service information may inform about which S-MCCH the particular MBMS uses.

The DS-SCH which is a transport channel, to which the P-MCCH is mapped, may be mapped to the PDCCH which is a the physical channel. The PDCCH carries a PMCCH-RNTI informing about which sub-frame the P-MCCH is included. In this case, the PDCCH may carry update information together with the PMCCH-RNTI. Upon receiving the update information via the PDCCH, the UE can recognize whether MBMS control information transmitted via the P-MCCH is to be updated or not based on the update information. The update information may be, for example, a value tag. If the value tag received via the PDCCH is different from a previously stored value tag, the UE determines that the MBMS control information has been updated, and updates the stored value tag with the currently received value tag.

The UE 100 monitors the PDCCH. If it is informed via the PDCCH as to whether the MBMS control information transmitted via the P-MCCH is to be updated, the UE 100 receives modified service information transmitted via the P-MCCH. If there is a service desired to be received by the UE 100 in the modified service information, the UE 100 receives an S-MCCH related to the corresponding service.

In the present invention, the MBMS service may be divided into a single cell service broadcast only to a single cell and a multi-cell service broadcast to several cells in the same manner. For this, the S-MCCH may be divided into an S-MCCH#1 for the single cell service and S-MCCH#N (N=2, 3, 4, ... ) for the multi-cell service.

The S-MCCH#1 is used to provide MBMS control information with respect to the single cell service in a particular cell and transmitted via the DL-SCH which is a transport channel. MBMS control information transmitted via the S-MCCH#1 of a particular cell may be different from that transmitted via the S-MCCH#1 of an another cell.

The MBMS control information transmitted via the S-MCCH#1 may include point-to-multipoint radio bearer information with respect to the single cell service, time scheduling information of the MTCH, or the like. While the MTCH of a cell service for the UE is received in a current cell, the UE 100 receives the S-MCCH#1 configured in the current cell.

The DL-SCH including the S-MCCH is mapped to the PDCCH which is a physical channel. The PDCCH may carry an SMCCH-RNTI informing about in which subframe the S-MCCH is positioned. In this case, the PDCCH may carry update information together with the SMCCH-RNTI. Upon receiving the update information via the PDCCH, the UE can recognize whether or not MBMS control information transmitted via the S-MCCH is to be updated according to the update information. If the modified service information includes a service desired to be received by the UE 100, the UE 100 receives, via the S-MCCH, update information related to the corresponding service. The update information may be, for example, a value tag. If the value tag received via the PDCCH is different from a previously stored value tag, the UE determines that the MBMS control information has been updated and updates the stored value tag with the currently received value tag.

The S-MCCH for the multi-cell service is used to carry control information with respect to a multi-cell service transmitted by using an MBSFN (MBMS Single Frequency Network). The S-MCCH for the multi-cell service is transmitted through the same radio resources in the same manner in every cell belonging to a single MBSFN. At least one S-MCCH is set in a single MBSFN area. The UE 100 receives the S-MCCH in a combining manner from the cells belonging to the MBSFN area. The S-MCCH is mapped to the transport channel MCH supporting the MBSFN and transmitted.

The S-MCCH for the multi-cell service carries MBMS control information with respect to the multi-cell service using the MBSFN. That is, for example, point-to-multipoint radio bearer information and time/frequency scheduling information of the MTCH may be included in the MBMS control information. While the UE 100 is receiving the MTCH of the multi-cell service transmitting in a single MBSFN area, it also receives the S-MCCH set in the corresponding MBSFN area.

Figure 6:
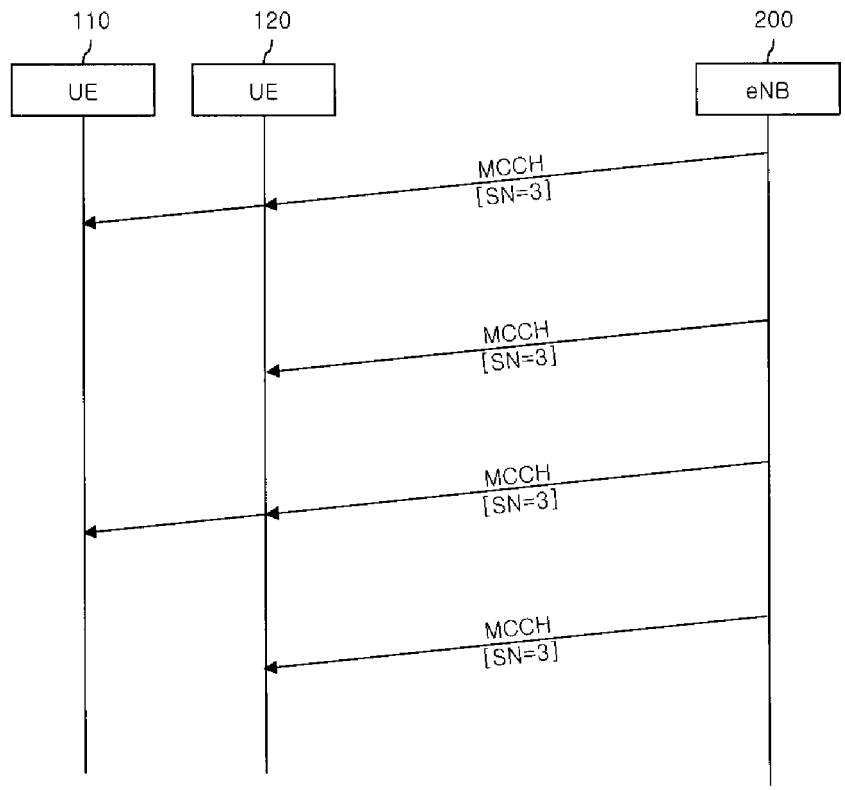
FIG. 6 is a flow chart showing MCCH transmission according to the present invention.

FIG. 6 is a flow chart showing MCCH transmission according to the present invention.

As shown in FIG. 6, the MCCH is available for HARQ retransmission. Because the MCCH may be changed at every modification period, the MCCH may be retransmitted within a single modification period.

If the MCCH, e.g., the P-MCCH or the S-MCCH#1, is mapped to the DL-SCH and is transmitted by the eNB 200, the MCCH may be re-transmitted by the eNB 200 according to HARQ.

Thus, if the PDCCH indicates HARQ transmission or retransmission of the MCCH together with a particular MCCH-RNTI, the UE 100 receives the transmitted or re-transmitted MCCH by using HARQ transmission or retransmission information provided by the PDCCH. When the MCCH is mapped to the DL-SCH and received, the UE 100 may request HARQ-retransmission of a particular MAC PDU (Protocol Data Unit), which has been transmitted via the MCCH, from the eNB 200 via an uplink control channel such as the PUCCH. Upon receiving the retransmission request, the eNB 200 retransmits the corresponding MAC PDU via the DL-SCH.

When the MCCH, e.g., an S-MCCH other than the S-MCCH#1, is mapped to the MCH and is transmitted by the eNB 200, the MCCH may be retransmitted by the eNB 200 according to a predefined configuration, i.e., HARQ. For example, the MCCH may be transmitted or retransmitted by the eNB 200 according to a predetermined time and frequency using the HARQ scheme. The eNB 200 transfers the predefined configuration to the UE 100 via the BCCH or the P-MCCH. Preferably, configuration information for the HARQ transmission of the P-MCCH may be transmitted via the BCCH and configuration information for the HARQ transmission of the S-MCCH may be transmitted via the P-MCCH.

The UE 100 receives the predefined configuration and receives the HARQ-transmitted or retransmitted MCCH via the MCH according to the predefined configuration.

Figure 7:
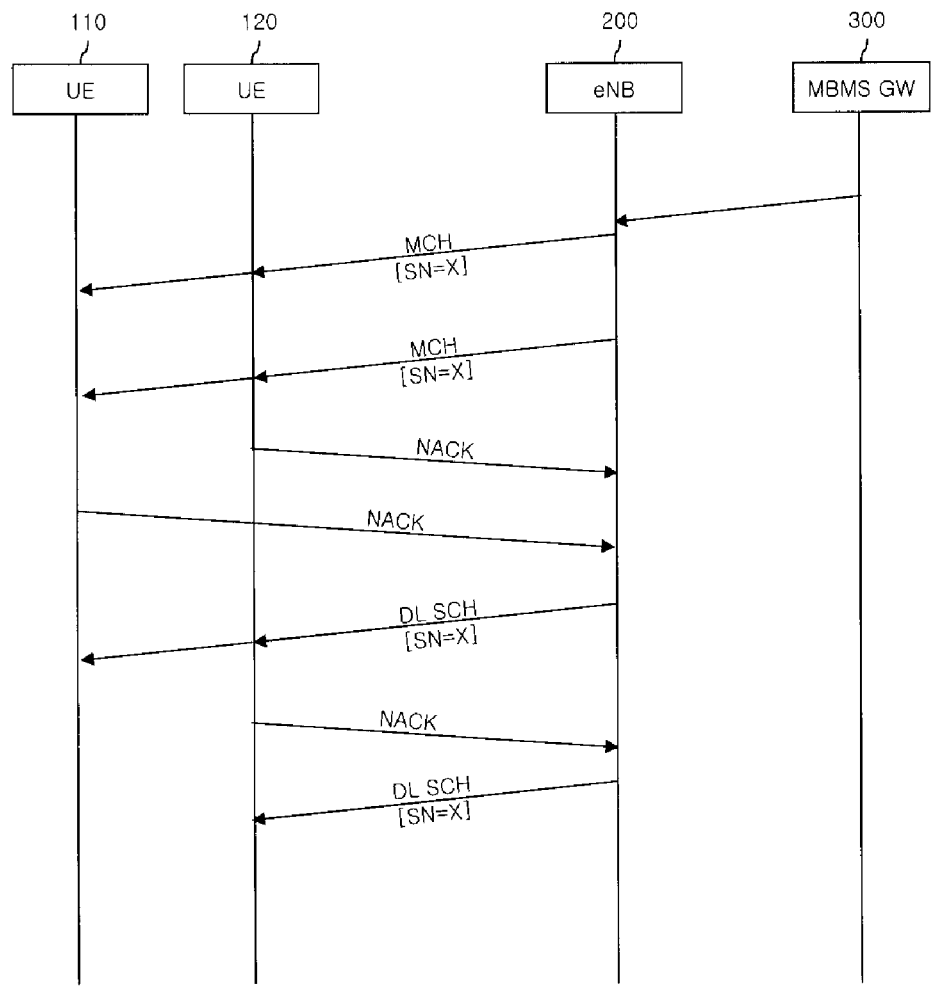
FIG. 7 is a flow chart showing MTCH transmission according to the present invention.

FIG. 7 is a flow chart showing MTCH transmission according to the present invention.

As shown in FIG. 7, when eNB 200 maps the MCCH or the MTCH to the MCH and transmit the MCCH or the MTCH, it may perform HARQ retransmission according to the predefined configuration. In this case, the MBMS gateway (GW) 300 transferring MBMS data to the eNB 200 may designate the number of retransmissions of a MBMS data unit having a particular number, which is transmitted via the MCH.

If the UE 100 fails to accurately receive a last data unit retransmitted according to the designated retransmission number, the UE 100 transmits a negative acknowledgement NACK via an uplink control signal, e.g., the PUCH, after the last MCH retransmission.

If the eNB 200 receives the NACK, it may retransmit the data unit via the DL-SCH.

When the UE 100 accurately receives the data unit, it transmits ACK to the eNB 200.

If the eNB 200 fails to receive ACK from every UE that receives the data unit, it may retransmit the data unit by the designated maximum HARQ retransmission number.

Figure 8:
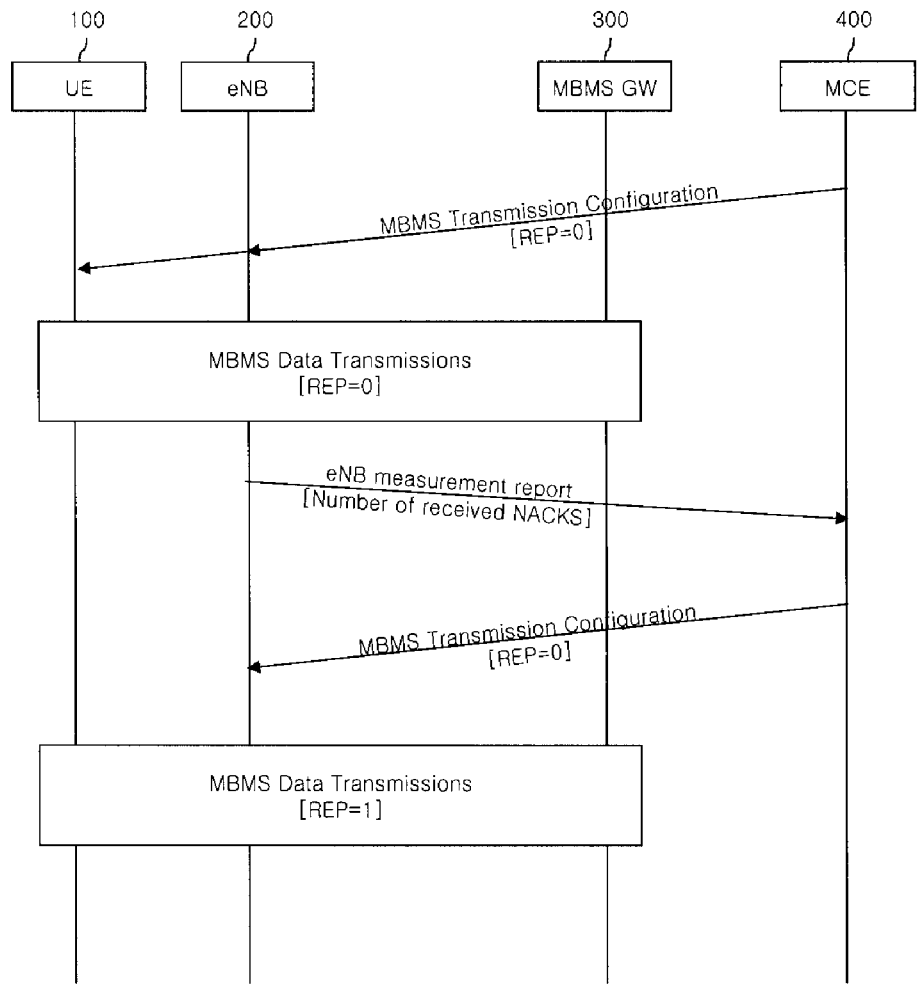
FIG. 8 is a flow chart showing controlling of retransmission of the MTCH according to the present invention.

FIG. 8 is a flow chart showing controlling of retransmission of the MTCH according to the present invention.

As shown in FIG. 8, an MCE (MBMS Coordinating Entity) 400 that manages several eNBs and controls transmission of the multi-cell service may designated the re-transmission number. The designated information of the retransmission number is transmitted to the eNB 200. This will now be described in detail.

The eNB 200 transmits data units to the UEs 100 according to the designated number. If the UEs 100 fail to accurately receive the data units, they may transmit NACK to the eNB 200. The eNB 200 counts the number of NACKs and reports the count result to the MCE 400. Then, the MCE 400 may adjust the retransmission number based on the reported counting information.

Figure 9:
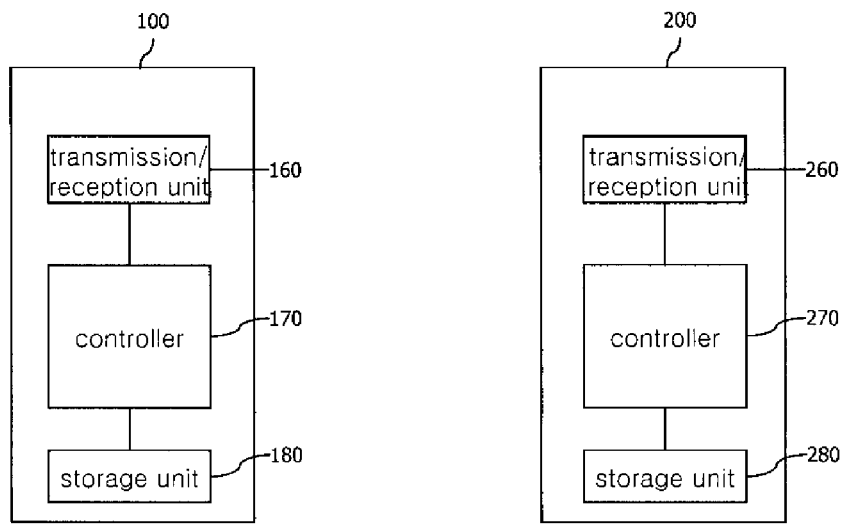
FIG. 9 is a block diagram showing the configurations of the UE and an eNB according to the present invention.

FIG. 9 is a block diagram showing the configurations of the UE and an eNB according to the present invention.

As shown in FIG. 9, the eNB 200 includes a transmission/reception unit 260, a controller 270, and a storage unit 280.

The transmission/reception unit 260 transmits a data unit of the MCCH including MBMS control information or a data unit of the MTCH including user data of an MBMS to the UE 100 via the DL-SCH which is a transport channel. The transmission/reception unit 260 may retransmit the data unit of the MCCH or the data unit of the MTCH according to HARQ. If the transmission/reception unit 260 receives a negative acknowledgement, e.g., NACK, from the UE 100, it may retransmit the data unit of the MCCH or the data unit of the MTCH. In addition, the transmission/reception unit 260 may transmit configured information for the HARQ to the UE 100.

The controller 270 controls the transmission/reception unit 260 and the storage unit 280, and configures the HARQ information, e.g., the HARQ retransmission number, IR pattern information of the HARQ, and predetermined time/frequency information of the HARQ transmission/retransmission.

The storage unit 280 stores the configured HARQ information.

The UE 100 as shown in FIG. 9 includes a transmission/reception unit 160, a controller 170, and a storage unit 180.

The transmission/reception unit 160 receives the HARQ information. And, the transmission/reception unit 160 attempts receiving of a data unit of the MCCH including the MBMS control information or the data unit of the MTCH including the user data of the MBMS via the DL-SCH or the DCH, which is a transport channel. If the reception fails, the transmission/reception unit 160 transmits a negative acknowledgement, e.g., NACK, to the eNB 200.

The controller 170 controls the transmission/reception unit 160 and the storage unit 180, and in case of the reception failure, the controller 170 transmits the negative acknowledgement.

The storage unit 180 stores the HARQ information.

The method described so far may be implemented by software, hardware or their combination. For example, the method according to the present invention may be stored in a storage medium (e.g., an internal memory of a mobile terminal, a flash memory, a hard disk, or the like), and may be implemented by codes or command languages in a software program that can be executed by a processor (e.g., an internal microprocessor of a mobile terminal).

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A method for receiving a broadcast or multicast service, comprising:
   receiving control information and/or data for the broadcast or multicast service via an MCH (Multicast Channel);
   transmitting a negative acknowledgement to a base station when the control information and/or data fail to be received via the MCH; and
   receiving the control information and/or data via a DL-SCH (Downlink Shared Channel),
   wherein retransmission for the control information and/or data is performed via the DL-SCH by an HARQ (Hybrid Automatic Repeat request) entity in an MAC (Media Access Control) layer when the control information and/or data fail to be received via the DL-SCH.

2. The method of claim 1, wherein the control information for the broadcast or multicast service corresponds to an MCCH (Multicast Control Channel) for MBMS (Multimedia Broadcast Multicast Service) control information, and the data for the broadcast or multicast service corresponds to an MTCH (Multicast Traffic Channel) for user data of the MBMS.

3. The method of claim 2, wherein the MBMS control information is carried using an RRC (Radio Resource Control) message.

4. The method of claim 1, further comprising:
   receiving HARQ (Hybrid Automatic Repeat Request) configuration information from the base station.

5. A method for transmitting a broadcast or multicast service, comprising:
   transmitting control information and/or data for the broadcast or multicast service to a terminal via an MCH (Multicast Channel);
   receiving a negative acknowledgement for the control information and/or data transmitted via the MCH; and
   transmitting the control information and/or data via a DL-SCH (Downlink Shared Channel),
   wherein retransmission for the control information and/or data is performed via the DL-SCH by an HARQ (Hybrid Automatic Repeat request) entity in an MAC (Media Access Control) layer when the control information and/or data fail to be received via the DL-SCH.

6. The method of claim 5, wherein the control information for the broadcast or multicast service corresponds to an MCCH (Multicast Control Channel) for MBMS (Multimedia Broadcast Multicast Service) control information, and the data for the broadcast or multicast service corresponds to an MTCH (Multicast Traffic Channel) for user data of the MBMS.

7. The method of claim 6, wherein the MBMS control information is carried using an RRC (Radio Resource Control) message.

8. The method of claim 5, further comprising:
   transmitting HARQ (Hybrid Automatic Repeat Request) configuration information related to the retransmission to the terminal.

9. A terminal having a MAC layer, comprising:
   an HARQ (Hybrid Automatic Repeat Request) entity that receives at least one PDU (Protocol Data Unit) of a broadcast or multicast service from a base station via a DL-SCH (Downlink Shared Channel) when the at least one PDU fails to be received via an MCH (Multicast Channel),
   wherein retransmission for the at least one PDU is performed via the DL-SCH by the HARQ entity when the at least one PDU fails to be received via the DL-SCH;
   a disassemble entity that generates an SDU (Service Data Unit) by using the at least one PDU; and
   a de-multiplexing entity that delivers the SDU to an upper layer.

10. A terminal, comprising:
    a transmission/reception unit; and
    a controller configured to
       receive control information and/or data for the broadcast or multicast service via an MCH (Multicast Channel),
       transmit a negative acknowledgement to a base station when the control information and/or data fail to be received via the MCH, and
       receive the control information and/or data via a DL-SCH (Downlink Shared Channel),
    wherein retransmission for the control information and/or data is performed via the DL-SCH by an HARQ (Hybrid Automatic Repeat request) entity in an MAC (Media Access Control) layer when the control infoimation and/or data fail to be received via the DL-SCH.

* * * * *